United States Patent
Ueda et al.

(10) Patent No.: US 6,578,382 B2
(45) Date of Patent: Jun. 17, 2003

(54) SYNTHETIC QUARTZ GLASS FOR OPTICAL USE, HEAT TREATMENT METHOD AND HEAT TREATMENT APPARATUS FOR THE SAME

(75) Inventors: Tetsuji Ueda, Koriyama (JP); Akira Fujinoki, Koriyama (JP); Hiroyuki Nishimura, Koriyama (JP)

(73) Assignees: Heraeus Quarzglas GmbH & Co. KG, Hanau (DE); Shin-Etsu Quartz Products Co., Ltd., Tokyo (JP)

( * ) Notice: Subject to any disclaimer, the term of this patent is extended or adjusted under 35 U.S.C. 154(b) by 236 days.

(21) Appl. No.: 09/821,352

(22) Filed: Mar. 28, 2001

(65) Prior Publication Data

US 2003/0066309 A1 Apr. 10, 2003

(51) Int. Cl.[7] ............................................... C03C 15/00
(52) U.S. Cl. .......................... 65/30.1; 65/111; 65/426; 65/900; 65/DIG. 8
(58) Field of Search ............................ 65/30.1, 111, 426, 65/900, DIG. 8

(56) References Cited

FOREIGN PATENT DOCUMENTS

| JP | 3088743 | 4/1991 |
|----|---------|--------|
| JP | 8091857 | 4/1996 |
| JP | 9124337 | 5/1997 |
| JP | 10279322 | 10/1998 |

*Primary Examiner*—Michael Colaianni
(74) *Attorney, Agent, or Firm*—Milde & Hoffberg LLP

(57) ABSTRACT

A method for heat treating a synthetic quartz glass for optical use in a heating furnace, that comprises covering the surroundings of a synthetic quartz glass body with a $SiO_2$ powder having a mean dissolved hydrogen molecule concentration of $1 \times 10^{19}$ molecules/cm$^3$ or higher, and then heat treating the body.

20 Claims, 1 Drawing Sheet

Fig. 1(A)
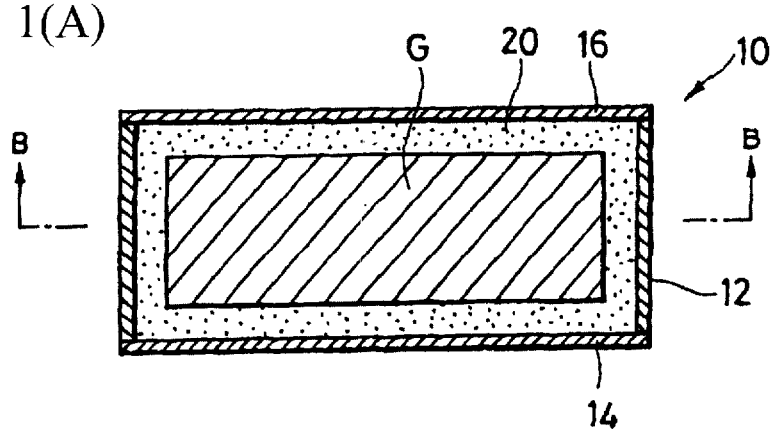
Fig. 1(B)
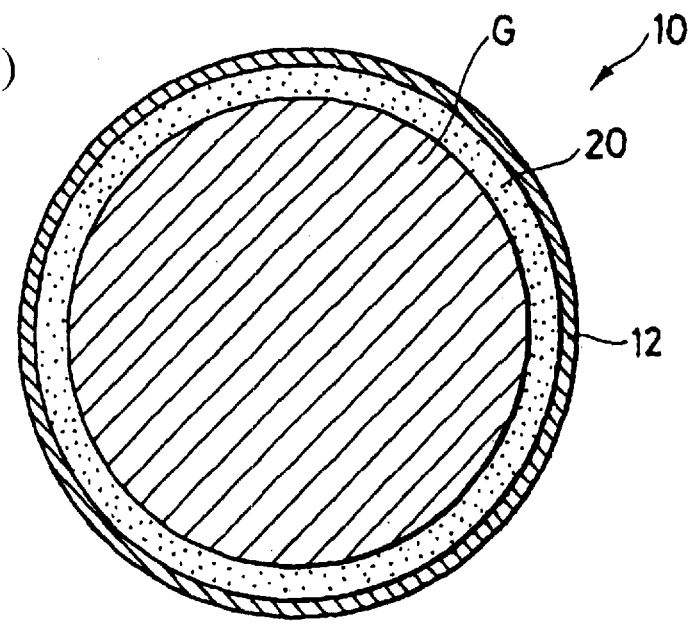
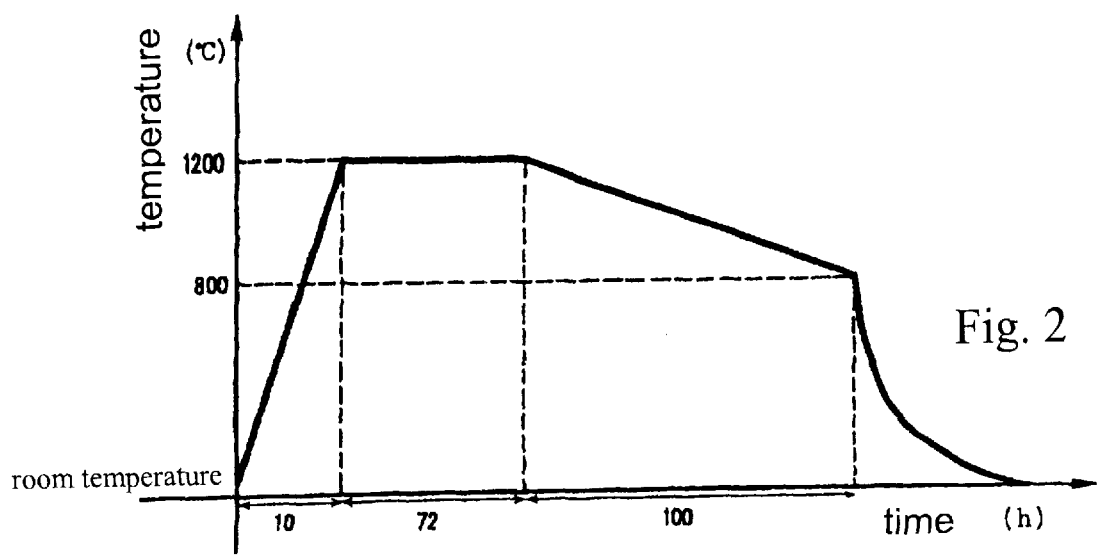
Fig. 2

SYNTHETIC QUARTZ GLASS FOR OPTICAL USE, HEAT TREATMENT METHOD AND HEAT TREATMENT APPARATUS FOR THE SAME

FIELD OF THE INVENTION

The present invention relates to a method for heat treating a synthetic quartz glass body for optical use. Such quartz glass bodies are highly homogeneous, having favorable high optical transmittance and high resistance against laser radiation, and they are suitable for use as an optical member in lithographic apparatuses working with an excimer laser. The present invention also relates to a heat treatment method for heat treating the synthetic quartz glass body and it relates to a heat treatment apparatus used for this method.

BACKGROUND OF THE INVENTION

Photolithography is a technology which comprises transferring the pattern provided on a photomask onto a wafer by using laser radiation. It is economically superior to other techniques using electron beams and X rays. Hence, it has been widely used heretofore in the steppers for producing semiconductor integrated circuits.

Recently, with an increase in the production of "Large Scale Integrated Circuits" (LSIs) with finer patterns and an increase in the degree of integration, light with still shorter wavelength is demanded for the exposure light source. Steppers using i-lines (365 nm in wavelength) capable of fabricating patterns with line widths in a range of from 0.4 to 0.5 $\mu$m or those using KrF excimer lasers (248.3 nm in wavelength) capable of patterning lines having a line width of from 0.25 to 0.35 $\mu$m have been practically used heretofore, and more recently, there is being developed a stepper using an ArF excimer laser (emitting light 193.4 nm in wavelength) for practical use, which is capable of patterning lines 0.13 to 0.2 $\mu$m in line width. Thus, it is demanded for the optical members for use in the apparatuses using ArF excimer laser lithography to satisfy requirements such as homogeneity, transmittance, resistance against laser radiation, etc., at high levels heretofore never realized.

As a material capable of satisfying such demands, high purity synthetic quartz glass is being used, and the optical transmittance and the resistance against laser radiations of such materials have been improved by optimizing the production conditions. At the same time, optical properties such as the homogeneity and birefringence are further increased. Among them, to improve the homogeneity and to reduce the birefringence, it is required to perform a heat treatment inclusive of gradual cooling (annealing treatment) during the production process of the optical member to remove the strain of the quartz glass. As a method of the heat treatment, generally employed was a method comprising maintaining the glass at high temperatures inside the heating furnace.

The hydrogen molecules dissolved inside a quartz glass contributes to the resistance against short wavelength radiations, and particularly, to the resistance against laser radiations. For instance, it is known that a drop in transmittance or a generation of fluorescent light, or an increase in refractive index of a quartz glass containing hydrogen molecules at an amount not lower than a certain level can be suppressed by exposure with an excimer laser for a long period (see JP-A-Hei3-88743 and JP-A-Hei9-124337)

However, in the heat treatment described above, because quartz glass is exposed to high temperatures for a long time, there occurs a problem that the quantity of hydrogen molecules incorporated inside the quartz glass is lowered, thereby resulting in a decrease in resistance against laser radiations.

Furthermore, since the heat treatment above is commonly performed by holding the quartz glass inside a heating furnace (e.g., an electric furnace) for a long duration of time, there was found another problem of process contamination, because the quartz glass under treatment would catch up impurities such as the alkaline metal elements discharged or transferred from the furnace material of the heating furnace or the jigs, or from the atmosphere, etc. Since the metallic impurities incorporated in the quartz glass for optical use induce a drop in the transmittance and the resistance against laser radiations, the contamination due to metallic impurities, particularly Na, must be suppressed as low as possible to obtain an optical member suitable for use in laser lithographic apparatuses.

In order to overcome those problems in the heat treatment process above, there is proposed a method comprising performing the heat treatment by covering the object to be treated with a proper cover. In JP-A-Hei10-279322 it is proposed to cover the object to be treated with synthetic quartz glass to prevent the object to be treated from being contaminated. However, prevention of contamination is the only object of the invention, and no consideration is made to the lowering of the concentration of dissolved hydrogen molecules. In JP-A-Hei8-91857 is proposed a method for obtaining a highly homogeneous quartz glass, which comprises thermally treating the object to be treated by covering the object with a sheet or a powder of silica. However, similar to the case of JP-A-Hei10-279322, in this invention again, no consideration is made on the measures for lowering the concentration of dissolved hydrogen molecules. Furthermore, although there is known doping of hydrogen molecules as a method of recovering the lowered concentration of hydrogen molecules, this method requires a special step for doping, and this led to a longer time of production and to an increase in production cost.

SUMMARY OF THE INVENTION

The present invention has been achieved in the light of the aforementioned problems, and an object of the present invention is to provide a synthetic quartz glass body for optical use showing improved transmitting properties and resistance against laser radiation, a method for heat treating the same, and a heat treatment apparatus for performing the method.

In general, the present invention provides for the heat treatment of an optical quartz glass object, wherein the heat treatment is conducted within an enclosed space with a $SiO_2$ powder surrounding the object. The $SiO_2$ powder has a relatively high surface area, and therefore tends to absorb impurities, such as alkaline metals, before they reach the quartz glass object. An enclosed vessel is preferably provided around the $SiO_2$ and optical quartz glass object during treatment, to contain the hydrogen and prevent external contamination. The $SiO_2$ powder has a relatively high initial hydrogen molecule concentration, e.g., a mean concentration of at least about $10^{19}$ molecules/cm$^3$, which is higher than the desired end hydrogen concentration of the optical quartz glass object, e.g., $2 \times 10^{17}$ molecules/cm$^3$ or higher, and therefore the hydrogen concentration in the environment around the optical quartz glass object tends to impede loss of hydrogen from the optical quartz glass object during the heat treatment process.

The problems above are solved by providing any of the constitutions of the present invention as follows:

(1) A method for heat treating a synthetic quartz glass body for optical use, comprising heating the quartz glass body in a heating furnace while said quartz glass body is covered with an $SiO_2$ powder, wherein the $SiO_2$ powder have a mean dissolved hydrogen molecule concentration of $1\times10^{19}$ molecules/cm$^3$ or higher.

(2) A method as stated in (1) above, wherein the total weight of said $SiO_2$ powder accounts for 25% or more of the weight of the synthetic quartz glass body.

(3) A method as stated in (1) or (2) above, wherein said $SiO_2$ powder is a synthetic $SiO_2$ powder containing 30 wt-ppb or less of Na.

(4) A method as stated above in one of (1) to (3), wherein at least 95% of the weight of said $SiO_2$ powder consists of particles having a diameter of 1,000 µm or less.

(5) A synthetic quartz glass for optical use that is produced by the heat treating method as stated above in one of (1) to (3), said synthetic quartz glass for optical use having a dissolved hydrogen molecule concentration of $2\times10^{17}$ molecules/cm$^3$ or higher and an initial transmittance for a light 193.4 nm in wavelength of 99.7% or higher.

(6) A heat treatment apparatus for heat treating of a synthetic quartz glass body for optical use, comprising a quartz glass vessel covered by a lid and having a volume of 1.5 times or more of the volume of the synthetic quartz glass body to be enclosed therein, said vessel is placed inside an heating furnace and filled with an $SiO_2$ powder having a mean dissolved hydrogen molecule concentration of $1\times10^{19}$ molecules/cm$^3$ or higher covering the surface of the synthetic quartz glass body.

(7) A heat treatment apparatus as stated in (6) above, wherein the total weight of said $SiO_2$ powder accounts for 25% or more of the weight of the synthetic quartz glass body.

(8) A heat treatment apparatus as stated above in one of (6) to (7), wherein said $SiO_2$ powder is a synthetic $SiO_2$ powder containing 30 wt-ppb or less of Na.

(9) A heat treatment apparatus as stated above in one of (6) to (8), wherein at least 95% of the weight of said $SiO_2$ powder consists of particles having a diameter of 1,000 µm or less.

BRIEF DESCRIPTION OF THE DRAWINGS

FIG. 1 shows the vessel which constitutes the main portion of the heat treatment apparatus for the synthetic quartz glass for optical use according to the present invention together with $SiO_2$ powder and a synthetic quartz glass for optical use to be treated, wherein (A) shows a vertical cross section view, and FIG. 1(B) is a cross section view taken along line B—B in FIG. 1(A).

FIG. 2 is a diagram showing an example of a temperature profile used in the heat treatment method for a synthetic quartz glass for optical use according to the present invention.

DETAILED DESCRIPTION OF THE PREFERRED EMBODIMENTS OF THE INVENTION

The heat treatment apparatus for a synthetic quartz glass for optical use according to the present invention is equipped with a heating furnace for use in the heat treatment of a synthetic quartz glass body that is the object to be treated. The heating furnace itself may be of any type of conventionally used heating furnaces, and the explanation therefor is omitted.

Furthermore, the heat treatment apparatus for a synthetic quartz glass for optical use according to the present invention comprises a vessel made of quartz glass and having a lid. In performing the heat treatment above, this lidded vessel is placed inside the heating furnace with the synthetic quartz glass body being enclosed therein.

Referring to FIG. 1, the lidded vessel 10 is provided in a similar cylindrical shape to the flat cylindrical synthetic quartz glass body G that is enclosed inside the vessel as the object to be treated, and is equipped with a ring-shaped side wall 12, a disk-shaped bottom plate 14, and a disk-shaped lid 16. The ring-shaped side wall 12 and the bottom plate 14 may be provided as separate bodies or integrated into a monolithic body.

The volume of the lidded vessel 10 is at least 1.5 times larger than the volume of the synthetic quartz glass body to be treated therein, and particularly preferably, it is 2 to 10 times as large as the synthetic quartz glass body.

The synthetic quartz glass body G to be treated has a radius in the range of from 50 to 200 mm and a thickness in a range of from about 30 to 200 mm. Hence, the lidded vessel 10 preferably has a volume in a range of from 450 to 250,000 cm$^3$. Furthermore, the vessel preferably has an outer diameter to the height ratio of 1.8 or more, and particularly preferably, 2.0 or more. Although there is no upper limitation concerning this ratio, a practical limit is thought to be about 10, so long as there is any opportunity of handling an extremely flat body.

The content of Na in the walls of the vessel 10 above is preferably 100 wt-ppb or lower, particularly 40 wt-ppb or lower, and more particularly, 5 wt-ppb or lower. Since the Na discharged from the vessel and the like is mostly trapped by the $SiO_2$ powder that is explained hereinafter, the quantity of Na reaching to the synthetic quartz glass body G is limited; however, the content of Na in the walls of the vessel 10 above is preferably set in the aforementioned range.

Furthermore, the production apparatus according to the present invention is equipped with $SiO_2$ powder 20 (see FIG. 1) that is charged inside the vessel 10 in such a manner that it covers the surface of the synthetic quartz glass body G to be treated. The $SiO_2$ powder used for this purpose can be obtained by doping the powder with hydrogen by high pressure hydrogen treatment, resulting in a mean dissolved hydrogen molecule concentration of $1\times10^{19}$ molecules/cm$^3$ or higher, and particularly preferably, 2 to $5\times10^{19}$ molecules/cm$^3$. The dissolved hydrogen molecule concentration may be a mean value of the entire $SiO_2$ powder to be used, and hence, there may be used a powder subjected to the hydrogen doping above mixed with a powder not subjected to the doping treatment.

The $SiO_2$ powder is provided to prevent escaping of hydrogen molecules from the synthetic quartz glass body G that treated during the heat treatment, and the total weight of the $SiO_2$ powder preferably accounts for 25% or more, and more preferably, accounts for 50 to 200% of the total weight of the total synthetic quartz glass body that is treated. If the total weight of the $SiO_2$ powder should account for less than 25%, it becomes difficult to sufficiently achieve the object of preventing the discharge of hydrogen molecules from the synthetic quartz glass body. On the other hand, if the total weight of the $SiO_2$ powder should exceed 200%, there causes an industrial excess for the achievement of the object, and this is not efficient.

The Na content in the $SiO_2$ powder is preferably 30 wt-ppb or lower, and particularly, 10 wt-ppb or lower. The less the Na content is, the more preferred. However, the lower limit achievable at present is about 5 wt-ppb.

As the $SiO_2$ powder above, preferably particles having a particle diameter in the range of 0.1 to 1000 μm, more preferably, 0.5 to 500 μm, account for 95% or more of the total weight of the powder being used. If the powder contains more particles having a diameter exceeding 1000 μm, there is a fear of making it impossible to sufficiently dissolve hydrogen molecules inside a part of the powder in the aforementioned high pressure hydrogen treatment; on the other hand, if the powder contains more particles having a diameter less than 0.1 μm, there occurs unfavorable problems in handling. If the particle diameter of the powder should become too large, difficulties are found in increasing the packing density. Hence, also from this point of view, it is preferred to use a powder not exceeding 1000 μm in particle diameter. However, so long as the particle diameter falls in a range of from 0.1 to 1000 μm, there may be used a mixed powder containing particles differing in particle diameter, and preferably, a powder having a certain range in particle size distribution often increases the packing density. Still, however, the effect of the present invention can be achieved so long as the $SiO_2$ powder substantially consists of particles having the particle diameter falling in the range of the aforementioned particle diameter. More specifically, there is no practical problem so long as powder having a particle diameter falling out of the range defined above should account for 5% by weight or less of the total weight of the $SiO_2$ powder.

Considering from the aforementioned conditions, particularly preferred is that the $SiO_2$ powder is a powder of synthetic quartz glass.

The method for producing a synthetic quartz glass for optical use by a heat treatment in a heating furnace according to the present invention comprises using the apparatus described above, and carrying out the heat treatment in a heating furnace on the synthetic quartz glass body that is to be treated, while covering the surface thereof with a $SiO_2$ powder having a mean dissolved hydrogen molecule concentration of $1 \times 10^{19}$ molecules/cm$^3$ or higher. The heat treatment can be performed in air. The conditions of the heat treatment, for instance, treating temperature, heating time, heating rate, cooling rate, etc., can be set at generally used values.

Thus, in accordance with the method of the present invention, there can be obtained a synthetic quartz glass for optical use having a dissolved hydrogen molecule concentration of $2 \times 10^{17}$ molecules/cm$^3$ or higher and yielding an initial transmittance for a radiation of 193.4 nm of 99.7% or higher.

The dissolved hydrogen molecule concentration above is preferably $5 \times 10^{17}$ molecules/cm$^3$ or higher. If the dissolved hydrogen molecule concentration should be lower than $2 \times 10^{17}$ molecules/cm$^3$, the desired resistance against laser radiation would not be achieved. The upper limit for the dissolved hydrogen molecule concentration at present is about $5 \times 10^{19}$ molecules/cm$^3$.

In the synthetic quartz glass according to the present invention, the Na content is preferably 10 wt-ppb or lower, and particularly preferably, 5 wt-ppb or lower. Furthermore, the fluctuation in refractive index, Δn, in the radius direction is preferably $1.0 \times 10^{-6}$ or smaller.

EXAMPLES

A mode of practicing an embodiment of the present invention is explained below by partly making reference to the attached drawings. It should be understood, however, that the dimensions, materials, shapes, relative positions, etc., are only given for examples or explanatory means so long as there is otherwise stated, and are by no means limiting the present invention.

As a synthetic quartz glass for use as an optical member, four synthetic quartz glass bodies (object to be treated), each 200 mm in outer diameter and 60 mm in thickness, were prepared by direct method. These synthetic quartz glass bodies were all found to have a Na concentration of 5 wt-ppb or lower, an initial transmittance for a radiation 193.4 nm in wavelength of 99.8%, and a hydrogen molecule concentration of $1.8 \times 10^{18}$ molecules/cm$^3$. The synthetic quartz glass bodies were subjected to a heat treatment in air under a temperature profile as shown in FIG. 2 in accordance with the method described below.

Example 1

A 4-kg portion of a high purity synthetic quartz glass powder having an impurity Na concentration of 20 wt-ppb and almost free from hydrogen molecules, and consisting of particles 53 to 710 μm in particle diameter was subjected to high pressure hydrogen treatment in an autoclave at a temperature of 600° C. under a pressure of 100 atm for a duration of 100 hours. The mean hydrogen molecule concentration of the powder was obtained from the pressure difference before and after the treatment to obtain a value of $2.0 \times 10^{19}$ molecules/cm$^3$.

Then, in a synthetic quartz glass vessel 250 mm in outer diameter, 100 mm in height, and 5 mm in wall thickness, the synthetic quartz glass body above, i.e., the object to be heat treated, was placed inside the vessel in such a manner that it should be centered inside the vessel while charging 2.9 kg of the powder obtained above by high pressure hydrogen treatment in such a manner to bury the synthetic quartz glass body. Thus, the heat treatment was performed after placing a synthetic quartz glass sheet 250 mm in outer diameter and 5 mm in thickness on the synthetic quartz glass body buried in the powder. More specifically, referring to FIG. 1, the heat treatment was performed on the synthetic quartz glass and the powder placed inside the heat treatment furnace. In this case, the total weight of the synthetic quartz glass accounted for 70% of the weight of the synthetic quartz glass body.

Example 2

A heat treatment was performed in the same manner as in Example 1, except for using, instead of the high purity synthetic quartz glass powder, a naturally occurring quartz (rock crystal) powder obtained by purifying IOTA (trademark) powder consisting of particles 53 to 710 μm in particle diameter in a chlorine-containing atmosphere to control the Na concentration thereof to 50 wt-ppb. The naturally occurring quartz powder used in the present Example was found to have a mean hydrogen molecule concentration of $2.0 \times 10^{19}$ molecules/cm$^3$.

Example 3

A heat treatment was performed in the same manner as in Example 1, except for using a powder subjected to high pressure hydrogen treatment containing mixed therein a synthetic quartz glass powder not subjected to the treatment, thereby controlling the mean hydrogen molecule concentration to $1.5 \times 10^{19}$ molecules/cm$^3$.

Comparative Example 1

A synthetic quartz glass body which is the object to be treated was subjected to the heat treatment by simply covering the body with the same lidded vessel as that used in Example 1, (but without using any synthetic quartz glass powder), and by placing it inside the heat treatment furnace. The other conditions were the same as those used in Example 1.

Comparative Example 2

A heat treatment was performed in the same manner as in Example 1, except for using the high purity synthetic quartz glass powder as it is without applying any high pressure hydrogen treatments.

Comparative Example 3

A heat treatment was performed in the same manner as in Example 1, except for shortening the time duration of the high pressure hydrogen treatment of the high purity synthetic quartz glass powder to 5 hours. The synthetic quartz glass powder was found to have a hydrogen molecule concentration of $3.0 \times 10^{18}$ molecules/cm$^3$.

The physical properties and the like of the SiO$_2$ powder use for the covering are listed in Table 1.

TABLE 1

Physical properties and the like of the SiO$_2$ powder used for filling the vessel.

| | Type of powder | Particle diameter of the powder ($\mu$m) | Na concentration (wt-ppb) | H2 molecule concentration (molecules/cm$^3$) |
|---|---|---|---|---|
| Example 1 | Synthetic quartz glass powder | 53-710 | 20 | $2 \times 10^{19}$ |
| Example 2 | Naturally occurring quartz powder | 53-710 | 50 | $2 \times 10^{19}$ |
| Example 3 | Synthetic quartz glass powder | 53-710 | 20 | $1.5 \times 10^{19}$ |
| Comp. Ex. 1 | Not used | — | — | — |
| Comp. Ex. 2 | Synthetic quartz glass powder | 53-710 | 20 | — |
| Comp. Ex. 3 | Synthetic quartz glass powder | 53-710 | 20 | $3.0 \times 10^{18}$ |

The hydrogen molecule (H$_2$) concentration, Na concentration, T % for a 193.4 line, and the fluctuation in refractive index before and after the heat treatment $\Delta$n were measured for each of the heat treated synthetic quartz glass products obtained in the Examples and Comparative Examples. The results are summarized in the following table.

TABLE 2

Properties of the quartz glass body before and after subjecting it to heat treatment

| | H$_2$ concentration before treatment (molecules/cm$^3$) | H$_2$ concentration after Treatment (molecules/cm$^3$) | Na concentration (wt-ppb) | 193.4-nm line transmittance (T %) |
|---|---|---|---|---|
| Example 1 | $1.8 \times 10^{18}$ | $7.2 \times 10^{17}$ | 2 | 99.8 |
| Example 2 | $1.8 \times 10^{18}$ | $6.5 \times 10^{17}$ | 5 | 99.7 |
| Example 3 | $1.8 \times 10^{18}$ | $4.0 \times 10^{17}$ | 2 | 99.8 |
| Comp. Ex. 1 | $1.8 \times 10^{18}$ | $1.4 \times 10^{17}$ | 2 | 99.8 |
| Comp. Ex. 2 | $1.8 \times 10^{18}$ | $1.1 \times 10^{17}$ | 2 | 99.8 |
| Comp. Ex. 3 | $1.8 \times 10^{18}$ | $1.6 \times 10^{17}$ | 2 | 99.8 |

From Table 2 it can be clearly understood that the synthetic quartz glass for optical use obtained as the treated product in Example 1 yields a hydrogen molecule concentration of $7.2 \times 10^{17}$ molecules/cm$^3$, a Na concentration of 2 wt-ppb or lower, and an initial transmittance for a radiation at a wavelength of 193.4 nm of 99.8%, and that it exhibits sufficiently high ultraviolet transmittance as an optical member for use in lithographic apparatuses.

The synthetic quartz glass for optical use obtained in Example 1 was also found to yield an extremely low value of $0.6 \times 10^{-6}$ for the fluctuation in refractive index after the heat treatment $\Delta$n of the synthetic quartz glass body G. This is believed attributed to the fact that, in cooling during the heat treatment, the entire system inclusive of the vessel and the quartz powder functioned as the object to be treated, in which the synthetic quartz glass for optical use was located at the core portion having small temperature gradient. Furthermore, this method was found extremely economical because the vessel and the quartz powder can be reused.

The synthetic quartz glass for optical use obtained in Example 2 was found to yield a hydrogen molecule concentration of $6.5 \times 10^{17}$ molecules/cm$^3$, a Na concentration of 5 wt-ppb, and an initial transmittance for a radiation at a wavelength of 193.4 nm of 99.7%. Thus, although somewhat inferior to the synthetic quartz glass obtained in Example 1, this product was also found to exhibit sufficiently high ultraviolet transmittance and hydrogen molecule concentration as an optical member for use in lithographic apparatuses.

Furthermore, concerning the fluctuation in refractive index $\Delta$n, the synthetic quartz glass for optical use obtained in Example 2 was found to yield an extremely low value of $0.8 \times 10^{-6}$ as the same as Example 1.

The synthetic quartz glass for optical use obtained in Example 3 was found to yield a hydrogen molecule concentration of $4.0 \times 10^{17}$ molecules/cm$^3$, a value slightly inferior to that of the synthetic quartz glass obtained in Example 1; however, this product was also found to exhibit a sufficient hydrogen molecule concentration. The other characteristics were about the same as those obtained for the product obtained in Example 1.

On the other hand, the treated product obtained in Comparative Example 1 was found to yield a hydrogen molecule concentration of $1.4 \times 10^{17}$ molecules/cm$^3$, a Na concentration of 50 wt-ppb, and an initial transmittance for a radiation at a wavelength of 193.4 nm of 99.5%. Thus, the product was found to yield an insufficient hydrogen molecule concentration and ultraviolet transmittance as an optical member for use in lithographic apparatuses. Further, in the treated product obtained in Comparative Example 1, the fluctuation in refractive index $\Delta$n was found to be $2.1 \times 10^{-6}$, a value larger than those obtained on the products obtained in the Examples.

In Comparative Example 2, the hydrogen molecule concentration of the treated product was found to be $1.1 \times 10^{17}$ molecules/cm$^3$, a value lower than that of Comparative Example 1, but the product maintained a Na concentration of 2 wt-ppb, and the fluctuation in refractive index $\Delta$n was found to be $0.6 \times 10^{-6}$, a value well comparable to that obtained on the product obtained in Example 1. As a result, this product was found to yield satisfactory value for the initial transmittance for a radiation at a wavelength of 193.4 nm of 99.8%, as well as for the fluctuation in refractive index $\Delta$n; however, as an optical member for use in lithographic apparatuses, the hydrogen molecule concentration was found to be insufficient.

In Comparative Example 3, the hydrogen molecule concentration of the treated product was found to be lowered to $1.6 \times 10^{17}$ molecules/cm$^3$, and was hence insufficient for use as an optical member for use in lithographic apparatuses.

The effect of the present invention can be clearly understood from the results above. The physical properties in the examples and comparative examples below are values obtained in accordance with measuring methods and the like as follows.

(1) Concentration of hydrogen molecules: The value was obtained in accordance with the method described in V. S. Khotimchenko et al., J. Appl. Spectrosc., 46 (1987), pp. 632–635.

(2) Content of Na: Measurement was made by flameless atomic absorption spectroscopy.

(3) Initial transmittances for a radiation 193.4 nm in wavelength: A value obtained as a ratio of the measured apparent value T % reduced to a unit thickness (10 mm) to the theoretical transmittance 90.86% for a radiation 193.4 nm in wavelength for a quartz glass, from which 0.18% corresponding to the loss ascribed to Rayleigh scattering is subtracted; that is, a value expressed by (T/90.68)×100.

(4) Measurement of the fluctuation in refractive index $\Delta n$: A value obtained by optical interferometry using a He—Ne laser (633 nm in wavelength) as the light source. The value is taken in an area of 180-mm diameter.

(5) Hydrogen molecule concentration in synthetic quartz glass powder: The pressure difference before and after the hydrogen treatment was measured, and the concentration was calculated by using the thus obtained value and the total weight of the synthetic quartz glass powder.

(6) Particle diameter of the synthetic quartz glass powder: The powder was classified by using JIS Nylon sieves provided with screens each having an opening of 53 $\mu$m and 710 $\mu$m.

Many aspects of the present invention employ known techniques, although employed in different contexts herein. Therefore, it should be understood that these known techniques and those associated with them may be employed in conjunction with the present invention, to the extent consistent therewith. It should also be understood that the various aspects of the invention may be employed together, individually or in subcombination.

Although the description above has shown, described and pointed out the fundamental novel features of the invention as applied to various embodiments, it should be understood that various omissions and substitutions and changes in the form and details of the system and method illustrated may be made by those skilled in the art, without departing from the spirit of the invention. Consequently, the full scope of the invention should be ascertained from the appended claims.

What is claimed is:

1. A method for heat treating a synthetic quartz glass body for optical use, comprising heating the quartz glass body in a heating furnace while said quartz glass body is covered with an SiO$_2$ powder, wherein the SiO$_2$ powder has a mean dissolved hydrogen molecule concentration of $1 \times 10^{19}$ molecules/cm$^3$ or higher.

2. A method as claimed in claim 1, wherein the total weight of said SiO$_2$ powder accounts for 25% or more of the weight of the synthetic quartz glass body.

3. A method as claimed in claim 1, wherein said SiO$_2$ powder is a synthetic SiO$_2$ powder containing 30 wt-ppb or less of Na.

4. A method as claimed in claim 2, wherein said SiO$_2$ powder is a synthetic SiO$_2$ powder containing 30 wt-ppb or less of Na.

5. A method as claimed in claim 1, wherein at least 95% of the weight of said SiO$_2$ powder consists of particles having a diameter of 1,000 $\mu$m or less.

6. A method as claimed in claim 2, wherein at least 95% of the weight of said SiO$_2$ powder consists of particles having a diameter of 1,000 $\mu$m or less.

7. A method as claimed in claim 3, wherein at least 95% of the weight of said SiO$_2$ powder consists of particles having a diameter of 1,000 $\mu$m or less.

8. A method as claimed in claim 1, wherein said synthetic quartz glass body has a dissolved hydrogen molecule concentration of $2 \times 10^{17}$ molecules/cm$^3$ or higher and an initial transmittance for a light 193.4 nm in wavelength of 99.7% or higher.

9. A method as claimed in claim 2, wherein said synthetic quartz glass body has a dissolved hydrogen molecule concentration of $2 \times 10^{17}$ molecules/cm$^3$ or higher and an initial transmittance for a light 193.4 nm in wavelength of 99.7% or higher.

10. A method as claimed in claim 3, wherein said synthetic quartz glass body has a dissolved hydrogen molecule concentration of $2 \times 10^{17}$ molecules/cm$^3$ or higher and an initial transmittance for a light 193.4 nm in wavelength of 99.7% or higher.

11. A method as claimed in claim 4, wherein said synthetic quartz glass body has a dissolved hydrogen molecule concentration of $2 \times 10^{17}$ molecules/cm$^3$ or higher and an initial transmittance for a light 193.4 nm in wavelength of 99.7% or higher.

12. A method as claimed in claim 1, further comprising the step of enclosing the synthetic quartz glass body in a quartz glass vessel covered by a lid and having a volume of 1.5 times or more of the volume of the synthetic quartz glass body, said vessel being adapted for durable operation when placed inside heating furnace.

13. A method as claimed in claim 12, wherein the total weight of said SiO$_2$ powder accounts for 25% or more of the weight of the synthetic quartz glass body.

14. A method as claimed in claim 12, wherein said SiO$_2$ powder is a synthetic SiO$_2$ powder containing 30 wt-ppb or less of Na.

15. A method as claimed in claim 13, wherein said SiO$_2$ powder is a synthetic SiO$_2$ powder containing 30 wt-ppb or less of Na.

16. A method as claimed in claim 12, wherein at least 95% of the weight of said SiO$_2$ powder consists of particles having a diameter of 1,000 $\mu$m or less.

17. A method as claimed in claim 13, wherein at least 95% of the weight of said, SiO$_2$ powder consists of particles having a diameter of 1,000 $\mu$m or less.

18. A method as claimed in claim 1, wherein said treatment modifies an optical property of the optical quartz glass body while maintaining a minimum hydrogen concentration therein.

19. A method as claimed in claim 1, wherein the quartz glass body is enclosed in an enclosure between 2 to 10 times as large as the synthetic quartz glass body.

20. A method as claimed in claim 1, wherein a resulting fluctuation in refractive index value after the heat treatment of the synthetic quartz glass body $\Delta n$ of less than or equal to $1 \times 10^{-6}$.

* * * * *